(12) United States Patent
Johansson et al.

(10) Patent No.: US 9,376,109 B2
(45) Date of Patent: Jun. 28, 2016

(54) MODULE AND METHOD PERTAINING TO MODE CHOICE WHEN DETERMINING REFERENCE VALUES

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 28 days.

(21) Appl. No.: 14/364,817

(22) PCT Filed: Dec. 22, 2011

(86) PCT No.: PCT/SE2011/051568
§ 371 (c)(1),
(2), (4) Date: Jun. 12, 2014

(87) PCT Pub. No.: WO2013/095233
PCT Pub. Date: Jun. 27, 2013

(65) Prior Publication Data
US 2014/0330503 A1 Nov. 6, 2014

(30) Foreign Application Priority Data

Dec. 22, 2011 (SE) .................................. 1151247-2

(51) Int. Cl.
*B60W 30/14* (2006.01)
*B60W 50/00* (2006.01)
(Continued)

(52) U.S. Cl.
CPC .............. *B60W 30/143* (2013.01); *B60K 31/00* (2013.01); *B60W 10/06* (2013.01); *B60W 10/11* (2013.01);
(Continued)

(58) Field of Classification Search
CPC .............. B60W 30/143; B60W 10/06; B60W 50/0097; B60W 50/08; B60K 31/00
USPC .......................................................... 701/93
See application file for complete search history.

(56) References Cited

U.S. PATENT DOCUMENTS 5,839,534 A 11/1998 Chakraborty et al.
5,931,886 A 8/1999 Moroto et al.
(Continued)

FOREIGN PATENT DOCUMENTS

DE 10 2005 045891 2/2007
DE 10 2009 030 784 A1 2/2010
(Continued)

OTHER PUBLICATIONS

International Search Report mailed Sep. 7, 2012 in corresponding PCT International Application No. PCT/SE2011/051569.
(Continued)

*Primary Examiner* — Mussa A Shaawat
*Assistant Examiner* — Michael Berns
(74) *Attorney, Agent, or Firm* — Ostrolenk Faber LLP

(57) ABSTRACT

Described is a method for determining a reference value for a vehicle. The method includes: performing a number of simulation cycles $S_j$ each comprising simulation steps: making a first prediction of the vehicle's speed $v_{pred\_cc}$ along the determined horizon with a conventional cruise control; comparing, in a first comparison, the predicted vehicle speed $v_{pred\_cc}$ with $v_{lim1}$ and $v_{lim2}$, which define a motor torque used in a subsequent simulation cycle; making a second prediction of the speed when the engine torque is a value that depends on the result of said comparison in the latest preceding simulation cycle; comparing, in a second comparison, the predicted vehicle speed $v_{pred\_Tnew}$ with $v_{min}$, and $v_{max1}$ which demarcate a range within which the speed is maintained; determining the reference value based on the second comparison and/or the second predicted speed in that simulation cycle $S_j$; and controlling the vehicle according to the reference value.

20 Claims, 3 Drawing Sheets

(51) Int. Cl.
*B60W 10/06* (2006.01)
*B60W 10/11* (2012.01)
*B60K 31/00* (2006.01)
*B60W 50/08* (2012.01)

(52) U.S. Cl.
CPC .......... *B60W 50/0097* (2013.01); *B60W 50/08* (2013.01); *B60W 2540/04* (2013.01); *B60W 2550/143* (2013.01); *B60W 2550/402* (2013.01); *B60W 2710/0666* (2013.01); *B60W 2720/10* (2013.01); *Y02T 10/84* (2013.01)

(56) References Cited

U.S. PATENT DOCUMENTS

| | | | |
|---|---|---|---|
| 6,076,036 A | 6/2000 | Price et al. | |
| 6,098,005 A | 8/2000 | Tsukamoto et al. | |
| 6,133,643 A * | 10/2000 | Lukich | F02D 31/007 290/40 A |
| 6,282,483 B1 | 8/2001 | Yano et al. | |
| 6,374,173 B1 * | 4/2002 | Ehlbeck | B60K 31/047 180/170 |
| 6,516,262 B2 * | 2/2003 | Takenaga | B60K 31/0008 340/907 |
| 6,782,961 B1 | 8/2004 | Ishikawa et al. | |
| 6,990,401 B2 * | 1/2006 | Neiss | B60K 31/0058 701/96 |
| 7,103,460 B1 | 9/2006 | Breed | |
| 7,315,804 B2 | 1/2008 | Sato et al. | |
| 8,260,488 B2 | 9/2012 | Ishikawa et al. | |
| 8,620,557 B2 | 12/2013 | Johansson et al. | |
| 8,620,558 B2 | 12/2013 | Johansson et al. | |
| 8,700,256 B2 * | 4/2014 | Duraiswamy | B60W 30/143 340/439 |
| 2003/0221886 A1 | 12/2003 | Petrie, Jr. et al. | |
| 2004/0068359 A1 | 4/2004 | Neiss et al. | 701/96 |
| 2004/0149106 A1 | 8/2004 | Hess | |
| 2004/0182652 A1 | 9/2004 | Ammon et al. | |
| 2005/0096183 A1 | 5/2005 | Watanabe et al. | |
| 2005/0273218 A1 | 12/2005 | Breed et al. | |
| 2006/0106521 A1 | 5/2006 | Nasr et al. | |
| 2007/0012013 A1 | 1/2007 | Strosser et al. | |
| 2007/0192013 A1 | 8/2007 | Bando et al. | |
| 2007/0208485 A1 | 9/2007 | Yamamura et al. | |
| 2007/0265759 A1 | 11/2007 | Salinas et al. | 701/93 |
| 2008/0033621 A1 | 2/2008 | Nakamura et al. | |
| 2009/0118918 A1 | 5/2009 | Heap et al. | |
| 2009/0118920 A1 | 5/2009 | Heap et al. | |
| 2010/0049400 A1 | 2/2010 | Duraiswamy et al. | 701/35 |
| 2010/0193616 A1 | 8/2010 | Berger et al. | |
| 2010/0198450 A1 | 8/2010 | Shin | |
| 2011/0106388 A1 | 5/2011 | Boeckenhoff et al. | |
| 2011/0208405 A1 | 8/2011 | Tripathi et al. | |
| 2011/0213540 A1 | 9/2011 | Tripathi et al. | |
| 2011/0276216 A1 | 11/2011 | Vaughan | |
| 2012/0150411 A1 | 6/2012 | Oosawa et al. | |
| 2012/0277940 A1 | 11/2012 | Kumar et al. | |
| 2014/0277971 A1 | 9/2014 | Oshiro et al. | |

FOREIGN PATENT DOCUMENTS

| | | |
|---|---|---|
| DE | 10 2008 035 944 A1 | 4/2010 |
| DE | 10 2010 003 428 A1 | 10/2011 |
| EP | 0 838 363 | 4/1998 |
| GB | 2480877 A | 12/2011 |
| JP | 2007-276542 A | 10/2007 |
| WO | WO 2006/107267 A1 | 10/2006 |
| WO | WO 2010/144028 A1 | 12/2010 |
| WO | WO 2010/144030 A1 | 12/2010 |
| WO | WO 2011/126430 A1 | 10/2011 |
| WO | WO 2011/126431 A1 | 10/2011 |
| WO | WO 2011/162705 A1 | 12/2011 |
| WO | WO 2011/162706 A1 | 12/2011 |

OTHER PUBLICATIONS

International Search Report mailed Sep. 7, 2012 in corresponding PCT International Application No. PCT/SE2011/051578.
International Search Report mailed Sep. 7, 2012 in corresponding PCT International Application No. PCT/SE2011/051575.
International Search Report dated Sep. 13, 2012 issued in corresponding International patent application No. PCT/SE2011/051577.
International Search Report dated Sep. 14, 2012 issued in corresponding International patent application No. PCT/SE2011/051570.
International Search Report mailed Sep. 11, 2012 in corresponding PCT International Application No. PCT/SE2011/051585.
Erik Hellström, "Explicit use of road topography for model predictive cruise control in heavy trucks," Master's thesis performed in Vehicular Systems, ISRN: LiTH-ISY-EX—05/3660—SE, Linköping, Feb. 21, 2005.
Maria Ivarsson, "Fuel Optimal Powertrain Control for Heavy Trucks Utilizing Look Ahead," Linköping Studies in Science and Technology, Thesis No. 1400, ISBN 978-91-7393-637-8, SE, Linköping, 2009.
Office Action mailed Mar. 16, 2015 in U.S. Appl. No. 14/364,796.
Office Action mailed Apr. 21, 2015 in U.S. Appl. No. 14/365,361.
Office Action mailed May 6, 2015 in U.S. Appl. No. 14/367,509.
Notice of Allowance mailed Apr. 13, 2015 in U.S. Appl. No. 14/367,465.
Notice of Allowance mailed Apr. 24, 2015 in U.S. Appl. No. 14/365,331.
International Search Report mailed Sep. 6, 2012 in corresponding PCT International Application No. PCT/SE2011/051568.
Erik Hellström et al., "Look-ahead control for heavy trucks to minimize trip time and fuel consumption," Control Engineering Practice, 17(2):245-254, 2009.
Sangjun Park et al., "Predictive Eco-Cruise Control: Algorithm and Potential Benefits," 2011 IEEE Forum on Integrated and Sustainable Transportation Systems (FISTS), pp. 394-399, Vienna, Austria, Jun. 29-Jul. 1, 2011.

* cited by examiner ized as c*i*…

MODULE AND METHOD PERTAINING TO MODE CHOICE WHEN DETERMINING REFERENCE VALUES

CROSS-REFERENCE TO RELATED APPLICATIONS

The present application is a 35 U.S.C. §§371 national phase conversion of PCT/SE2011/051568, filed Dec. 22, 2011, which claims priority of Swedish Application No. 1151247-2, filed Dec. 22, 2011. The contents of both applications are incorporated by reference herein. The PCT International Application was published in the English language.

FIELD OF THE INVENTION

The present invention relates to a module and a method for determining at least one reference value for a vehicle's control system according to the present disclosure.

BACKGROUND TO THE INVENTION

Cruise control is now usual in motor vehicles, e.g. cars, trucks and buses. An object of cruise control is to achieve a uniform predetermined speed. This is done either by adjusting the engine torque to avoid retardation, or by applying braking action on downhill runs where the vehicle is accelerated by its own weight. A more general object of cruise control is to provide convenient driving and better comfort for the vehicle's driver. A driver of a vehicle equipped with cruise control usually chooses a set speed $v_{set}$ as the speed he/she wishes the vehicle to maintain on level roads. A cruise control then supplies an engine system of the vehicle with a reference speed $v_{ref}$ used for control of the engine. The set speed $v_{set}$ may thus be regarded as an input signal to the cruise control, whereas the reference speed $v_{ref}$ may be regarded as an output signal from the cruise control and is used for control of the engine.

Today's traditional cruise control (CC) maintains a constant reference speed $v_{ref}$ usually set by the vehicle's driver in the form of a set speed $v_{set}$ which is thus here a desired speed chosen for example by him/her, and for today's conventional cruise controls the reference speed is constant and equal to the set speed, i.e. $v_{ref}=v_{set}$. The value of the reference speed $v_{ref}$ changes only when adjusted by the driver while the vehicle is in motion. The reference speed $v_{ref}$ is then sent to a control system which controls the vehicle so that its speed corresponds when possible to the reference speed $v_{ref}$. If the vehicle is equipped with an automatic gearchange system, the gears may be changed by that system on the basis of the reference speed $v_{ref}$ to enable the vehicle to maintain the reference speed $v_{ref}$, i.e. to enable it to maintain the desired set speed $v_{set}$.

In hilly terrain, the cruise control system will try to maintain the set speed vset uphill and downhill. This may result inter alia in the vehicle accelerating over the crest of a hill and into a subsequent downgrade. It will then need to be braked to avoid exceeding the set speed $v_{set}$ or will reach a speed $v_{kfb}$ at which the constant speed brake is activated, which is a fuel-expensive way of driving the vehicle. It may also need to be braked downhill to avoid exceeding the set speed $v_{set}$ or the constant speed brake's activation speed $v_{kth}$ in cases where the vehicle does not accelerate over the crest of the hill.

To reduce fuel consumption, especially on hilly roads, economical cruise controls such as Scania's Ecocruise® have been developed. This cruise control tries to estimate the vehicle's current running resistance and also has information about its historical running resistance. The economical cruise control may also be provided with map data comprising topographical information. The vehicle is then located on the map, e.g. by means of GPS, and the running resistance along the road ahead is estimated. The vehicle's reference speed $v_{ref}$ can thus be optimised for different types of roads in order to save fuel, in which case the reference speed $v_{ref}$ may differ from the set speed $v_{set}$. This specification refers to cruise controls which allow the reference speed $v_{ref}$ to differ from the set speed $v_{set}$ chosen by the driver, i.e. reference speed-regulating cruise controls.

An example of a further development of an economical cruise control is a "look ahead" cruise control (LACC), a strategic form of cruise control which uses knowledge of sections of road ahead, i.e. knowledge of the nature of the road ahead, to determine the reference speed $v_{ref}$. LACC is thus an example of a reference speed-regulating cruise control whereby the reference speed $v_{ref}$ is allowed, within a certain range, to differ from the set speed $v_{set}$ chosen by the driver, in order to achieve more fuel saving.

Knowledge of the road section ahead may for example comprise information about prevailing topology, road curvature, traffic situation, roadworks, traffic density and state of road. It may further comprise a speed limit on the section ahead, and a traffic sign beside the road. Such knowledge is for example available from location information, e.g. GPS (global positioning system) information, map information and/or topographical map information, weather reports, information communicated between vehicles and information provided by radio. All this knowledge may be used in a variety of ways. For example, information about a speed limit on the road ahead may be used to achieve fuel efficiency by lowering the vehicle's speed before reaching a lower speed limit. Similarly, knowledge of a road sign which indicates for example a roundabout or intersection ahead may also be used to achieve fuel efficiency by braking before the vehicle reaches the roundabout or intersection.

An LACC cruise control does for example make it possible, before a steep upgrade, for the reference speed $v_{ref}$ to be raised to a level above the set speed $v_{set}$, since the vehicle will be expected to lose speed on such a climb owing to high train weight relative to engine performance. Similarly, before a steep downgrade, the LACC cruise control makes it possible for the reference speed $v_{ref}$ to be lowered to a level below the set speed $v_{set}$, since the vehicle will be expected (predicted) to accelerate on such a downgrade owing to its high train weight. The concept here is that reducing the speed at which the vehicle begins the downhill run makes it possible to reduce the energy braked away and/or the air resistance losses (as reflected in the amount of fuel injected before the downgrade). The LACC cruise control may thus reduce fuel consumption without substantially affecting journey time.

In hilly terrain, a reference speed-regulating cruise control, unlike a conventional cruise control, can thus actively vary the vehicle's speed. For example, the vehicle's speed will be reduced before a steep downgrade to enable it to utilise more of the cost-free energy provided by the downgrade, instead of braking it away. The speed may also be increased before a steep climb to prevent the vehicle losing too much speed and time.

Different drivers often have different needs and wishes with regard to how cruise control should behave to specifically suit them and their needs, e.g. a driver may not always be interested in and willing to focus primarily on saving fuel but may sometimes wish instead to achieve shorter journey time. EP0838363 describes a method and device for controlling the speed of a vehicle by using conventional or adaptive cruise control. The driver can change the way the vehicle behaves by altering the cruise control's limit values with regard to how much the vehicle is allowed to accelerate or decelerate, and thus switch between a sport mode and a comfort mode. This solution applies only to conventional cruise controls and adaptive cruise controls which have no knowledge of the road ahead. These solutions are therefore not optimum, since imminent hills, bends, road signs etc. cannot be foreseen and therefore cannot be catered for in advance. Moreover, the driver's scope for setting the cruise control's functions is very limited, since there are only two modes to choose from.

SUMMARY OF THE DISCLOSURE

An object of the present invention is to propose an improved module and method for controlling a vehicle's speed which enhance driver acceptance of the vehicle's cruise control and which in particular cater for running resistance on road sections ahead.

According to an aspect of the present invention, the above object is at least partly achieved by use of the aforesaid module, which is characterised by:

an input unit adapted to receiving at least one set speed $v_{set}$ for the vehicle;

a mode choice unit adapted to choosing from at least two selectable driving modes each comprising a unique set of settings which influence the calculation of the at least one reference value;

a horizon unit adapted to determining for the itinerary, by means of map data and location data, a horizon made up of one or more route segments with at least one characteristic for each segment;

a calculation unit adapted to performing, during each of a number of simulation cycles $s_j$ each comprising a number N of simulation steps conducted at a predetermined rate f, the steps of:

making a first prediction of the vehicle's speed $v_{pred\_cc}$ along the horizon according to a conventional cruise control when the set speed $v_{set}$ is imparted as a reference speed $v_{ref}$ which first prediction depends on the characteristics of said route segment;

doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;

making a second prediction of the vehicle's speed $v_{pred\_Tnew}$ along the horizon when the vehicle's engine torque T is a value which depends on the result of said first comparison in the immediately preceding simulation cycle $s_{j-1}$;

doing a second comparison of the second predicted vehicle speed $v_{pred\_Tnew}$ with at least one of second lower and upper limit values $v_{min}$ and $v_{max}$ which delineate a range within which the vehicle's speed should be; and determining said at least one reference value along the horizon which indicates how the vehicle's speed is to be influenced, which determination is based on the chosen driving mode and on said second comparison and/or the second predicted vehicle speed $v_{pred\_Tnew}$ in this simulation cycle $s_j$, so that the at least one reference value is within a range which is bounded by the second lower and upper limit values $v_{min}$ and $v_{max}$; and a providing unit adapted to supplying a control system of the vehicle with said at least one reference value on which the vehicle is then regulated.

According to an aspect of the present invention, the object described above is at least partly achieved by using the aforesaid method which is characterised by:

acquiring a set speed $v_{set}$ for the vehicle;

making a choice from at least two selectable driving modes each comprising a unique set of settings which influence the calculation of the at least one reference value;

determining for the itinerary, by means of map data and location data, a horizon made up of one or more route segments with at least one characteristic for each segment;

performing, during each of a number of simulation cycles $s_j$ each comprising a number N of simulation steps N conducted at a predetermined rate f, the steps of:

making a first prediction of the vehicle's speed $v_{pred\_cc}$ along the horizon according to a conventional cruise control when the set speed $v_{set}$ is imparted as a reference speed $v_{ref}$ which first prediction depends on the characteristics of said route segment;

doing a first comparison of the first predicted vehicle speed $v_{pred\_cc}$ with at least one of first lower and upper limit values $v_{lim1}$ and $v_{lim2}$ which are used to define an engine torque T for use in the next simulation cycle $s_{j+1}$;

making a second prediction of the vehicle's speed $v_{pred\_Tnew}$ along the horizon when the vehicle's engine torque T is a value which depends on the result of said first comparison in the immediately preceding simulation cycle $s_{j-1}$;

doing a second comparison of the second predicted vehicle speed $v_{pred\_Tnew}$ with at least one of second lower and upper limit values $v_{min}$ and $v_{max}$ which delineate a range within which the vehicle's speed should be;

determining at least one reference value which indicates how the vehicle's speed is to be influenced, which determination is based on said mode choice and on said second comparison and/or the second predicted vehicle speed $v_{pred\_Tnew}$ in this simulation cycle $s_j$, so that the at least one reference value is within a range which is bounded by the second lower and upper limit values $v_{min}$ and $v_{max}$; and using in a control system of the vehicle said at least one reference value on which the vehicle is then regulated.

The at least one reference value is here preferably a reference speed $v_{ref}$, a reference torque $T_{ref}$ or a reference engine speed $\omega_{ref}$.

The fact that the driver can influence the way the vehicle's speed is maintained by choosing between different driving modes enables him/her to match the vehicle's behaviour with prevailing traffic density and road type or with his/her temperament and/or driving style, thereby enhancing driver acceptance of using the system. It is for example sometimes more desirable to have shorter journey time than to drive in a fuel-economising way, in which case the driver can, by changing driving mode, cause the vehicle to be regulated on the basis of the desire for shorter journey time.

For example, in a situation where the traffic density increases, it is easy for the driver to switch from an economical mode which may cause great variations in the vehicle's speed to a normal mode, to avoid causing irritation to other road users by large variations in his/her vehicle's speed. A normal mode is here defined as more like a traditional cruise control than an economical mode and results in a more acceptable mode of driving in dense traffic. Changes of driving mode may involve altering permissible speed ranges, gearshift points for the automatic gearchange system, permissible acceleration levels etc.

Since a driving mode comprises a number of settings all regulated by a choice of mode which is easy for the driver to effect, the present invention makes it easier for him/her to set the vehicle with a view to achieving a certain driving effect. This means that a mode choice is all that the driver has to do, instead of effecting individually each of the settings covered by the mode. It also has the effect of improving traffic safety in that the driver's concentration can now be focused on driving the vehicle.

In other words, the present invention makes setting the cruise control's parameters very user-friendly. By one or two very simple inputs the driver can now determine how the vehicle's speed is to be controlled.

Applying a method which defines the limits for the magnitude of the reference value, i.e. which defines the lower and upper limit values $v_{min}$ and $v_{max}$ which delineate the range within which the vehicle's speed should be, results in a predictable and robust way of quickly calculating reference values for use by one or more of the vehicle's control systems.

According to an embodiment of the invention, the lower and upper limit values $v_{min}$ and $v_{max}$ are defined on the basis of the choice of driving mode. This has a direct effect on how the at least one reference value is determined.

According to an embodiment of the invention the mode choice defines a weighting parameter $\beta$ which is then used in evaluating one or more cost functions when determining said at least one reference value, and has a direct effect on how the at least one reference value is determined.

According to an embodiment of the invention, the lower and upper limit values $v_{min}$ and $v_{max}$ and the weighting parameter $\beta$ are defined on the basis on the choice of driving mode.

Preferred embodiments are described herein.

BRIEF DESCRIPTION OF THE ATTACHED DRAWINGS

The invention is described below with reference to the attached drawings, in which.

DETAILED DESCRIPTION OF PREFERRED EMBODIMENTS OF THE INVENTION

Figure 1:
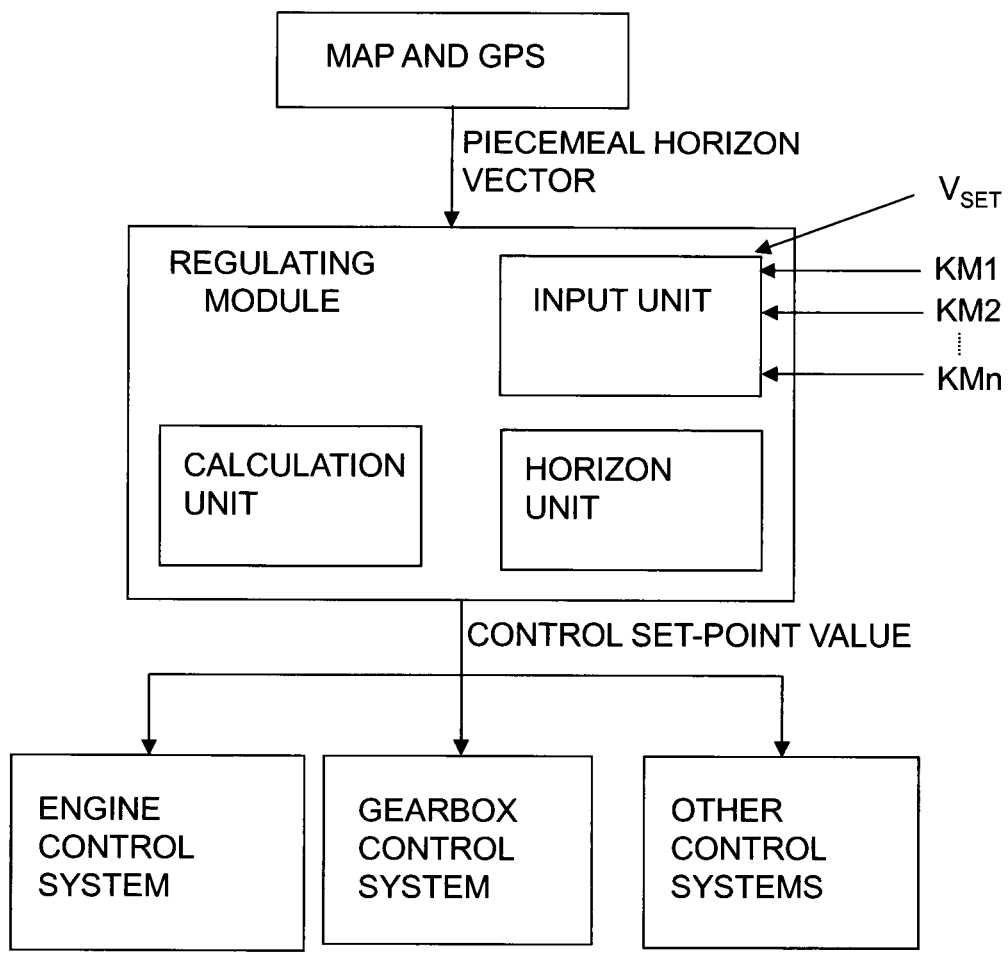
FIG. 1 depicts the module's functional engagement in the vehicle according to an embodiment of the invention.

FIG. 1 depicts a module for controlling a vehicle's speed according to an aspect of the invention. The module comprises an input unit adapted to receiving a desired speed, i.e. a set speed $v_{set}$, for the vehicle. The driver may for example set a speed $v_{set}$ which he/she wishes the vehicle to maintain. The module comprises also a mode choice unit which may be a part of the input unit. This mode choice unit is adapted to choosing a driving mode. The choice of driving mode may be based on input of driving modes $KM_1, KM_2, \ldots KM_n$ via the input unit, as depicted in FIG. 1.

The input unit may also be adapted to receiving input values for the second lower limit value $v_{min}$ and the second upper limit value $v_{max}$ (not depicted in the diagram). The module comprises also a horizon unit adapted to determining a horizon H for the itinerary by means of map data and location data. The horizon H is made up of route segments with at least one characteristic for each segment. A possible example of the characteristics of route segments is their gradient $\alpha$, in radians.

The description of the present invention states that GPS (global positioning system) is used to determine location data for the vehicle, but specialists will appreciate that other kinds of global or regional positioning systems are conceivable to provide these data. Such positioning systems might for example use radio receivers to determine the vehicle's location. The vehicle might also use sensors to scan the surroundings and thereby determine its location.

FIG. 1 illustrates how the module is provided with information about the itinerary from maps (map data) and GPS (location data). The itinerary is sent to the module bit by bit, e.g. via CAN (controller area network) bus. The module may be separate from or be part of the one or more control systems which are to use reference values for regulating. An example of such a control system is the vehicle's engine control system. The control system may also be any other appropriate control system of the vehicle, e.g. cruise control, gearbox control system or other control systems. For example, a horizon is put together for each control system, since the control systems regulate on different parameters. Alternatively, the unit which handles maps and positioning systems may also be part of a system which is to use reference values for regulating. In the module, the bits of the itinerary are then put together in a horizon unit to construct a horizon and are processed by the processor unit to create an internal horizon on which the control system can regulate. The horizon is then continually supplemented by new bits of itinerary from the unit with GPS and map data, to maintain a desired length of horizon. The horizon is thus updated continuously when the vehicle is in motion.

CAN is a serial bus system specially developed for use in vehicles. The CAN data bus makes digital data exchange possible between sensors, regulating components, actuators, control devices etc., and provides assurance that two or more control devices can have access to the signals from a given sensor in order to use them to control components connected to them. Each of the connections between the units illustrated in FIG. 1 may take the form of one or more from among a cable, a data bus, e.g. a CAN (controller area network) bus, an MOST (media orientated systems transport) bus, or some other bus configuration, or a wireless connection.

The module comprises also a calculation unit adapted to, during a number of simulation cycles $s_j$ each comprising a number N of simulation steps which are conducted at a predetermined rate f, in each simulation cycle make a first prediction of the vehicle's speed $v_{pred\_cc}$ along the horizon according to a conventional cruise control when the desired speed $v_{set}$ imparted is a reference speed $v_{ref}$, which first prediction depends on the characteristics of said route segment. A first comparison is also done between the first predicted vehicle speed $v_{pred\_cc}$ and first lower and upper limit values $v_{lim1}$ and $v_{lim2}$ which are used to define an engine torque T for use in the next simulation cycle $s_{j+1}$.

A second prediction of the vehicle speed $v_{pred\_Tnew}$ along the horizon is then made on the basis of a vehicle engine torque T which depends on the result of said first comparison in the immediately preceding simulation cycle $s_{j-1}$. This simulation cycle $s_j$ thus here uses the first comparison in the preceding simulation cycle $s_{j-1}$ when the second prediction of the vehicle speed $v_{pred\_Tnew}$ is made in this simulation cycle $s_j$.

In a second comparison, the second predicted vehicle speed $v_{pred\_Tnew}$ is then compared with second lower and upper limit values $v_{min}$ and $v_{max}$ which delineate a range within which the vehicle's speed should be. This is followed by determining at least one reference value which indicates how the vehicle's speed is to be influenced on the basis of the chosen driving mode and said second comparison and/or the second predicted vehicle speed $v_{pred\_Tnew}$. According to the present invention, the at least one reference value is so determined that it is within the range bounded by the second limit values $v_{min}$ and $v_{max}$. How the choice of driving mode is used in determining the at least one reference value and how inter alia the second lower and upper limit values $v_{min}$ and $v_{max}$ are determined according to various embodiments of the invention will be described in more detail below.

The module is further arranged to supply, e.g. by sending, to a control system of the vehicle said at least one reference value on which the vehicle is then regulated.

The module and/or the calculation unit comprise at least a processor and a memory unit which are adapted to making all the calculations, predictions and comparisons of the method according to the invention. Processor means here a processor or microcomputer, e.g. a circuit for digital signal processing (digital signal processor, DSP), or a circuit with a predetermined specific function (application integrated specific circuit. ASIC). The calculation unit is connected to a memory unit which provides it with, for example, the stored programme code and/or stored data which the calculation unit needs to enable it to do calculations. The calculation unit is also adapted to storing partial or final results of calculations in the memory unit.

The method for control of vehicle speed according to the present invention and its various embodiments may also be implemented in a computer programme which, when executed in a computer, e.g. the aforesaid processor, causes the computer to apply the method. The computer programme usually takes the form of a computer programme product stored on a digital storage medium, and is contained in a computer programme product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

Figure 2:
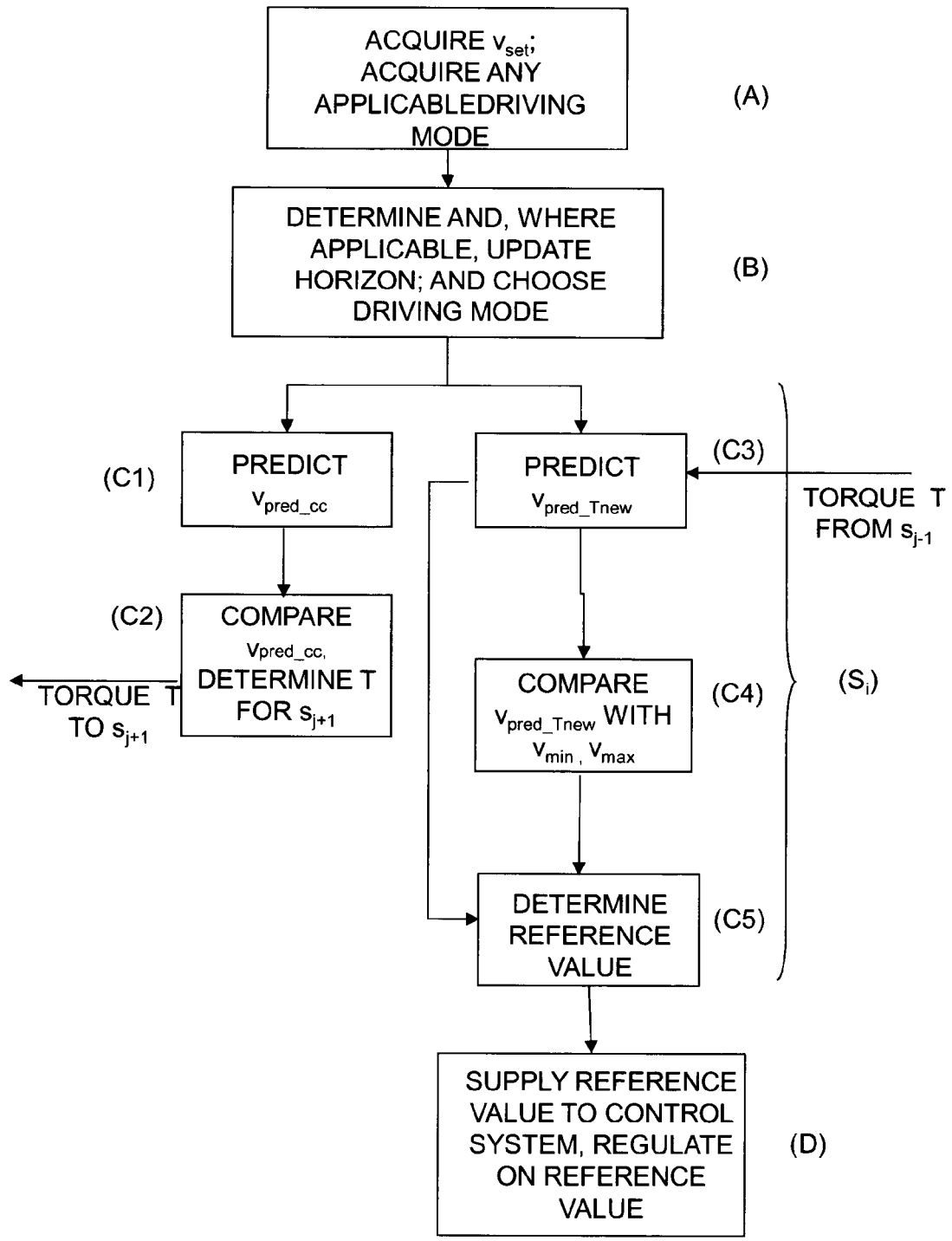
FIG. 2 is a flowchart for the steps which the module is arranged to perform according to an embodiment of the invention.

FIG. 2 is a flowchart for the steps of the method for controlling the vehicle's speed according to an embodiment of the invention. The method comprises a first step A) of acquiring $v_{set}$ as a desired set speed for the vehicle to maintain. Where applicable, this first step A) may also comprise acquiring a chosen driving mode $KM_1, KM_2, \ldots KM_n$ via the input unit.

As a second step B), a horizon for the itinerary is determined by means of map data and location data comprising route segments with at least one characteristic for each segment, and the driving mode to be applied in the simulations. The choice of driving mode may here be based on driver input of chosen driving modes $KM_1, KM_2, \ldots KM_n$ but may also be made on the basis of other parameters. Also the second lower and upper limit values $v_{min}$ and $v_{max}$, so that the set speed $v_{set}$ can be determined in this second step B). The lower and upper limit values $v_{min}$ and $v_{max}$ may here be determined on the basis of driver input and/or be determined automatically on the basis of parameters such as time gaps to vehicles in front. This will be described in more detail below.

According to the method, a number of simulation cycles are then done along the length of the horizon. A simulation cycle $s_j$ comprises a number N of simulation steps conducted at a predetermined rate f, and the following steps are performed during each simulation cycle $s_j$:

C1) Making a first prediction of the vehicle's speed $v_{pred\_cc}$ along the horizon according to a conventional cruise control when the desired speed $v_{set}$ is imparted as a reference speed $v_{ref}$, which first prediction depends on the characteristics of said route segment.

C2) Doing a first comparison of the first predicted vehicle speed $v_{pred\_cc}$ with first lower and upper limit values $v_{lim1}$ and $v_{lim2}$ which are used to define an engine torque T for use in the next simulation cycle $s_{j+1}$.

C3) Making a second prediction of the vehicle's speed $v_{pred\_Tnew}$ along the horizon when the vehicle's engine torque T depends on the result of said first comparison in the immediately preceding simulation cycle $s_{j-1}$. During a simulation cycle $s_j$ the prediction according to C1) and the prediction according to C3) are thus made in parallel as illustrated in FIG. 2. The result of the first comparison of the first predicted vehicle speed $v_{pred\_acc}$ with first lower and upper limit values $v_{lim1}$ and $v_{lim2}$ in the immediately preceding simulation cycle $s_{j-1}$ determines the torque T to be used in making the second prediction of the vehicle's speed $v_{pred\_Tnew}$ during this simulation cycle $s_j$.

C4) Doing a second comparison of the second predicted vehicle speed $v_{pred\_Tnew}$ with the second lower and upper limit values $v_{min}$ and $v_{max}$ determined at step B) which delineate a range within which the vehicle's speed should be and within which the set speed $v_{set}$ has to be.

C5) Determining at least one reference value which indicates how the vehicle's speed is to be influenced, on the basis of the mode choice and said second comparison and/or the second predicted vehicle speed $v_{pred\_Tnew}$ in this simulation cycle $s_j$.

This simulation cycle $s_j$ thus comprises steps C1-C5. The amount of time required for a simulation cycle $s_j$ depends on the rate f. If all five steps C1-C5 are performed at a rate of 5 Hz, this simulation cycle $s_j$ will take 1 second.

As a further step D) said at least one reference value is then supplied, e.g. by being sent via a CAN bus, to a control system of the vehicle in which it is used to regulate the vehicle's speed according to said at least one reference value.

Figure 3:
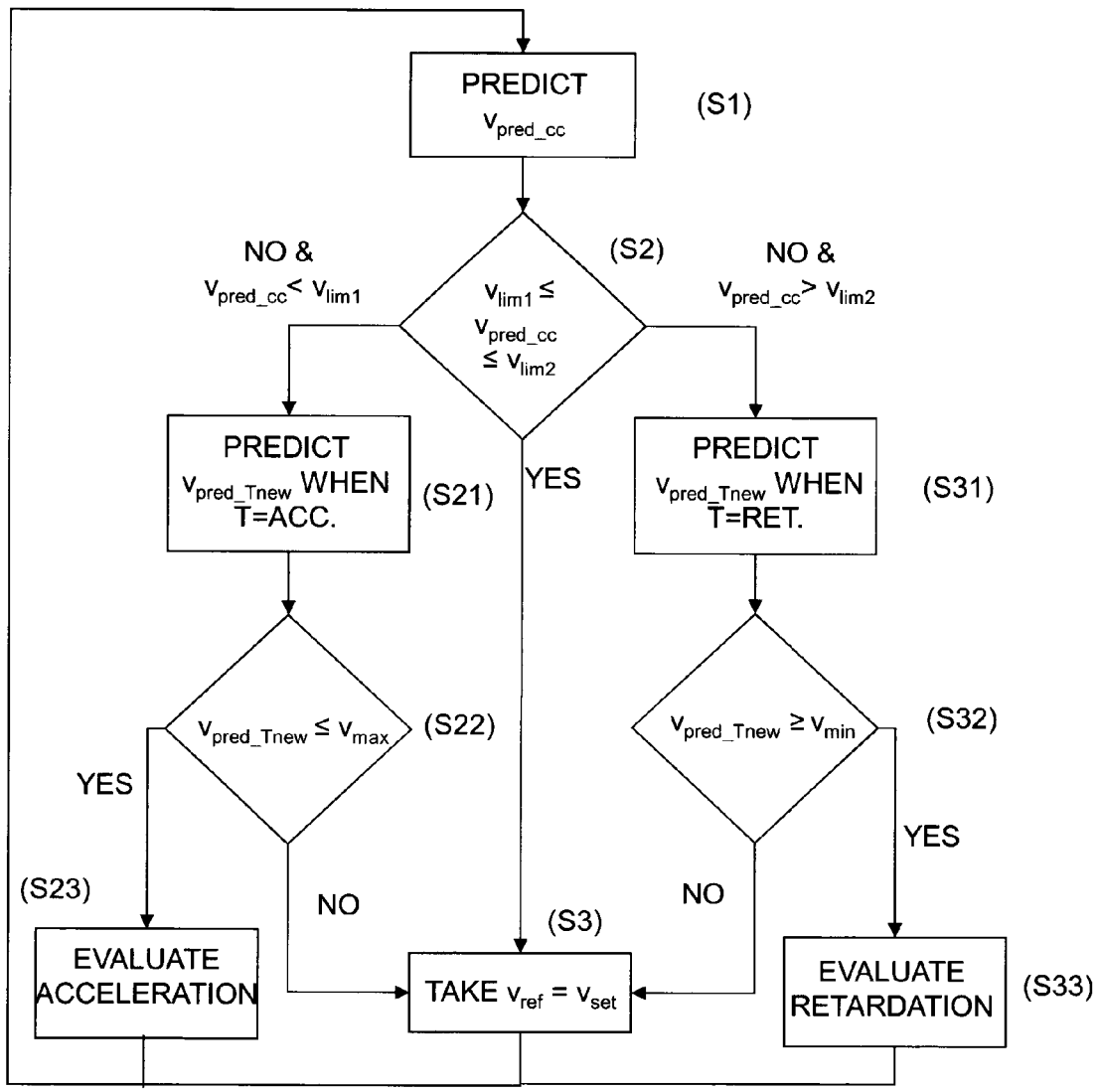
FIG. 3 is a flowchart according to an embodiment of the invention.

FIG. 3 is a flowchart illustrating schematically in more detail how the second lower and upper limit values $v_{min}$ and $v_{max}$ and the range defined by them are used in determining the at least one reference value. The diagram shows the first predicted speed $v_{pred\_cc}$ being predicted as a first step S1. When it has been predicted for N steps, the first predicted speed $v_{pred\_cc}$ is compared with at least one of the first lower and upper limit values $v_{lim1}$ and $v_{lim2}$, as depicted at a second step S2. If the first predicted speed $v_{pred\_cc}$ is below the first lower limit value $v_{lim1}$ an upgrade is identified, but if it is above the first upper limit value $v_{lim2}$ a downgrade is identified.

If an upgrade is identified, i.e. if the first predicted speed $v_{pred\_cc}$ is below the first lower limit value $v_{lim1}$, the vehicle's engine torque T in the prediction of the second predicted vehicle speed $v_{pred\_Tnew}$ is taken as a torque which accelerates the vehicle (e.g. a maximum torque) in the next simulation cycle $s_{j+1}$, as illustrated at step S21 in FIG. 3. This does however presuppose that the first predicted speed $v_{pred\_cc}$ was below the first lower limit value $v_{lim1}$ before, where applicable, being above the first upper limit value $v_{lim2}$.

If on the contrary a downgrade is identified, i.e. if the first predicted speed $v_{pred\_cc}$ is above the first upper limit value $v_{lim2}$, the vehicle's engine torque T in the prediction of the second predicted vehicle speed $v_{pred\_Tnew}$ is taken as a torque which retards the vehicle (e.g. a minimum torque) in the next simulation cycle $s_{j1}$, as illustrated at step S31 in FIG. 3. This does however presuppose that the first predicted speed $v_{pred\_cc}$ was above the first upper limit value $v_{lim2}$ before, where applicable, it becomes lower than the first lower limit value $v_{lim1}$. According to an embodiment, the calculation unit explained above with reference to FIG. 1 is adapted to doing the calculations and comparisons here described.

According to a preferred embodiment of the invention described above, if a hill is identified by the analysis described above of the first predicted speed $v_{pred\_cc}$, specific rules are applied to determine which one or more reference values the vehicle is to be regulated on. According to this embodiment, the calculation unit is adapted to using rules for determining the at least one reference value.

According to an embodiment of the invention, the second predicted vehicle speed $v_{pred\_Tnew}$ is compared with the respective second lower and upper limit values $v_{min}$ and $v_{max}$ which define a range within which the vehicle's speed should be. These comparisons are done at steps S22 and S32 in FIG. 3.

According to an embodiment of the invention, such a rule is that if the second predicted vehicle speed $v_{pred\_Tnew}$ is within the range defined by the second lower and upper limit values $v_{min}$ and $v_{max}$, i.e. if $v_{min} \leq v_{pred\_Tnew} \leq v_{max}$, the method moves on to steps S23 and S33 respectively, in which the vehicle's imparted reference value is determined as a value which represents the second predicted speed $v_{pred\_Tnew}$ It is thus possible to ensure that the vehicle's speed will not be above or below the respective speed limits defined by the second lower and upper limit values $v_{min}$ and $v_{max}$.

If the second predicted vehicle speed $v_{pred\_Tnew}$ is predicted with an accelerating torque at step S21, it is then compared with the second upper limit value $v_{max}$ as a step S22. According to an embodiment of the invention, if the second predicted speed $v_{pred\_Tnew}$ is below or equal to the second upper limit value $v_{max}$, it is to be imparted as reference value at step S23. The second predicted speed $v_{pred\_Tnew}$ is then preferably imparted as reference value at the time P1 when the first predicted speed $v_{pred\_cc}$ is below the first lower limit value $v_{lim1}$, provided that the second predicted vehicle speed $v_{pred\_Tnew}$ is predicted not to exceed the second upper limit value $v_{max}$.

In a similar way, the second predicted vehicle speed $v_{pred\_Tnew}$ is compared with the second lower limit value $v_{min}$ as a step S32 if it is predicted on the basis of a retarding torque. According to an embodiment of the invention, if the second predicted vehicle speed $v_{pred\_Tnew}$ is above or equal to the second lower limit value $v_{min}$, the reference value which resulted in the second predicted vehicle speed $v_{pred\_Tnew}$ is to be imparted at step S33. The second predicted vehicle speed $v_{pred\_Tnew}$ is thus preferably imparted at the time when the first predicted speed $v_{pred\_cc}$ is above the second upper limit value $v_{max}$, provided that the second predicted speed $v_{pred\_Tnew}$ is predicted not to be below the second lower limit value $v_{min}$.

At step S33, according to an embodiment, the reference speed $v_{ref}$ is determined to a value which represents the second predicted vehicle speed $v_{pred\_Tnew}$ if on the basis of a retardation the latter exceeds the second limit value $v_{min}$ and also exceeds a further upper limit value $v_{max2}$, or is equal either to the second lower limit value $v_{min}$ or to the further upper limit value $v_{max2}$ which is related to a set speed $v_{set}$. According to an embodiment, the further upper limit value $v_{max2}$ corresponds to the set speed plus a constant $c_1$, i.e. $v_{max2} = v_{set} + c_1$. According to another embodiment, the further upper limit value $v_{max2}$ corresponds to a factor $c_1$ multiplied by the set speed, i.e. $v_{max2} = v_{set} * c_1$. This factor $c_1$ may for example have the value 1.02, meaning that the further upper limit value $v_{max2}$ is 2% higher than the set speed $v_{set}$.

At step S23, according to an embodiment, the reference speed $v_{ref}$ is determined to a value which corresponds to the second predicted vehicle speed $v_{pred\_Tnew}$ based on an acceleration, if this second predicted speed so based is below the second upper limit value $v_{max}$ and is also below a further lower limit value $v_{min2}$, or is equal to the second upper limit value $v_{max}$ or the further lower limit value $v_{min2}$ which is related to a set speed. According to an embodiment, the further lower limit value $v_{min2}$ corresponds to the set speed minus a constant $c_2$, i.e. $v_{min2} = v_{set} - c_2$. According to another embodiment, the further lower limit value $v_{min2}$ corresponds to a factor $c_2$ multiplied by the set speed, i.e. $v_{min2} = v_{set} * c_2$. This factor $c_2$ may for example have the value 0.98, meaning that the further upper limit value $v_{max2}$ is 2% lower than the set speed $v_{set}$.

The method according to the present invention results in a constant and predetermined processor load when determining this at least one reference value, so the driver can easily set how these reference values are determined by single inputs in the system. A single mode choice directly results, according to the invention, in a particular behaviour of the vehicle, simplifying the settings for the driver and also resulting in a vehicle behaviour desired by him/her. Use of the system will thus be increased through greater acceptance by drivers.

The set speed $v_{set}$ is thus the driver's input signal related to a desired cruise control speed, and the at least one reference value is the value on which the vehicle is then regulated. The at least one reference value is preferably a reference speed $v_{ref}$, a reference torque $T_{ref}$ or a reference engine speed $\omega_{ref}$.

The reference speed $v_{ref}$ is imparted to the speed regulator of the engine control unit. In traditional cruise control, as mentioned above, the reference speed $v_{ref}$ is equal to the set speed, i.e. $v_{ref} = v_{set}$. The speed regulator then controls the vehicle's speed on the basis of the reference speed $v_{ref}$ by demanding necessary torque from the engine's torque regulator. According to the embodiment in which the at least one reference value is a reference torque $T_{ref}$, it may be sent directly to the engine's torque regulator. In the embodiment where the at least one reference value is a reference engine speed $\omega_{ref}$, it may be sent directly to the engine's speed regulator.

By using information about its itinerary, a vehicle's reference speed $v_{ref}$ to the speed regulator can be regulated to cater for saving fuel, enhancing safety and improving comfort. As specialists will appreciate, other reference values to other control systems may also be regulated. The topography greatly affects the control in particular of the power train of heavy vehicles, since much more torque is required to travel uphill than downhill and to travel up steep hills without changing gear.

According to the present invention, reference values can be determined in a computationally efficient way. The module adapted to applying the method according to the invention may also be part of a control system whose reference values it is intended to regulate, but may also be a freestanding module separate from the control system.

The module according to the present invention comprises a mode choice unit adapted to setting a driving mode, e.g. on the basis of input by the vehicle's driver of a suitable mode chosen from at least two selectable modes each comprising a unique set of settings which influence the calculation of the at least one reference value. FIG. 1 depicts the various driving modes as $KM_1$, $KM_2$ ... $KM_n$. There may therefore be n selectable driving modes for the driver to choose from.

The result is a module which can be implemented in a vehicle to set the calculations of reference values, e.g. reference speeds $v_{ref}$ according to the driver's wishes. He/she makes a mode choice, e.g. by pressing a button, turning a knob, operating a control, making a menu choice, touching a touch screen or effecting some other kind of input, and thereby sets a number of parameters and/or functions by a single input.

There is thus no need for the driver to do various settings separately, since they can be covered jointly by a single mode choice. Since the settings are particularly selected to achieve a desired effect, the driver needs no particular knowledge to be able to set the vehicle so that it is regulated as desired, i.e. so that it is regulated in a way which meets his/her wishes. The module may be part of a control system whose set-point values it is intended to regulate, or be a freestanding module separate from the control system.

According to an embodiment of the present invention, the chosen driving mode defines the second lower and upper limit values $v_{min}$ and $v_{max}$. The mode choice thus here defines the width of the range between these limit values. It thereby also defines the limits within which the reference values, e.g. the reference speed $v_{ref}$, are allowed to vary relative to the set speed $v_{set}$.

The mode choice causes the calculation unit to carry out instructions which set the width of the range between the second lower and upper limit values $v_{min}$ and $v_{max}$. In this way the range within which the reference values, e.g. the reference speed $v_{ref}$, are allowed to vary can be set, and consequently how fuel-economisingly the vehicle is to be driven. A wide range provides scope for larger fuel savings than a narrower range.

According to an embodiment, the range is asymmetrical relative to the set speed $v_{set}$. According to an embodiment, the larger portion of the range is below the set speed $v_{set}$, making more fuel saving possible, since the reference value is allowed to drop more. According to another embodiment, the larger portion of the range is above the set speed $v_{set}$, making shorter journey times possible, since the reference value is allowed to rise more, which may result in higher average speed.

For example, four different range widths may be defined, e.g. "maximum range width", "medium range width", "minimum range width" and "even range width". The placing of these ranges depends on the set speed $v_{set}$ chosen by the driver. The values for the second lower and upper limit values $v_{min}$ and $v_{max}$ which demarcate the range are related, according to an embodiment, to the set speed $v_{set}$, e.g. as a percentage of it.

According to an embodiment, the values for the second lower and upper limit values $v_{min}$ and $v_{max}$ are related to the set speed $v_{set}$ in the form of absolute speed values in km/h. A non-limitative example of such range widths/modes with a set speed of 80 km/h is set out below.

| Speed range | Width range | Example $v_{min}$ | Example $v_{max}$ |
| --- | --- | --- | --- |
| Maximum | 13-20 km/h | $v_{set}$ − 12 = 68 km/h | $v_{set}$ + 3 = 83 km/h |
| Medium | 6-12 km/h | $v_{set}$ − 8 = 72 km/h | $v_{set}$ + 3 = 83 km/h |
| Minimum | 0-5 km/h | $v_{set}$ = 80 km/h | $v_{set}$ + 5 = 85 km/h |
| Even | 2-16 km/h | $v_{set}$ − 5 = 75 km/h | $v_{set}$ + 5 = 85 km/h |

The "maximum range width" might be 13-20 km/h, e.g. −12 and +3 km/h relative to the 80 km/h set speed. The "medium range width" might be 6-12 km/h, e.g. −8 and +3 km/h relative to the set speed. The "minimum range width" might be 0.5 km/h, e.g. 0 and +5 km/h relative to the set speed. The "even range width" might be 2-16 km/h and be evenly split relative to the 80 km/h set speed, e.g. −5 and +5 km/h relative to the set speed $v_{set}$. As specialists will appreciate, these range widths may also assume other values than those exemplified above.

According to an embodiment, the chosen driving mode decides how determining the at least one reference value is to be done. The method for determining, for example, the reference speed $v_{ref}$ is thus controlled by mode choice.

According to an embodiment, the mode choice defines the vehicle's permissible acceleration and/or retardation if the at least one reference value is a reference speed $v_{ref}$. In this case the calculation unit sets on the basis of the mode choice the vehicle's permissible acceleration and retardation, making it possible to choose the amount of comfort desired to the detriment of fuel saving, and vice versa. The comfort criterion thus limits the vehicle's permissible acceleration and/or retardation. By a single input of chosen driving mode the driver can here determine whether comfort or fuel saving is more important at the time, a facility which he/she is likely to regard very positively.

According to an embodiment of the invention, three different settings/modes are defined for acceleration and retardation, as non-limitatively exemplified below.

| Acceleration/retardation | Permissible acceleration/retardation range |
| --- | --- |
| Maximum | 1-3 m/s$^2$ |
| Medium | 0.5-1 m/s$^2$ |
| Minimum | 0.02-0.5 m/s$^2$ |

"Maximum permissible acceleration and/or retardation" allows acceleration/retardation within the range 1-3 m/s$^2$. "Medium permissible acceleration and/or retardation" allows acceleration/retardation within the range 0.5-1 m/s$^2$. "Minimum permissible acceleration and/or retardation" allows acceleration/retardation within the range 0.02-0.5 m/s$^2$. As specialists will appreciate, the various modes may also have other values than those here exemplified.

According to an embodiment the permissible acceleration/retardation range depends on the vehicle's weight, which means for example that the ranges for the "maximum permissible acceleration and/or retardation" and "medium permissible acceleration and/or retardation" modes will be equal for a heavy vehicle in certain cases, since drag torque or maximum engine torque may respectively subject the vehicle to more than average retardation or acceleration in these cases. There may also be physical limitations which affect range widths.

According to an embodiment of the invention, a desired speed increase or decrease is ramped by applying Torricelli's equation (eq. 1) to calculate the constant acceleration and retardation at which the vehicle is to be driven, provided that this acceleration and/or retardation is permissible. The mode choice here defines the limits for these accelerations and/or retardations, so that desired comfort is achieved.

Torricelli's equation reads $$v_{slut}^2 = v_i^2 + 2 \cdot a \cdot s \qquad (\text{eq. 1})$$

in which $v_i$ is the vehicle's initial speed in a route segment, $v_{slut}$ is its speed at the end of the segment, a is the constant acceleration/retardation and s is the length of the segment.

The chosen driving mode may also, according to an embodiment of the invention, define settings in various other systems of the vehicle, e.g. in its automatic gear choice system, cruise control system etc., in which case the calculation unit ensures that these settings are effected in the respective systems.

The various different settings of parameters described above may be given particular values to achieve various desired effects in the vehicle. Each driving mode which the driver can choose by input of $KM_1, KM_2 \ldots KM_n$ comprises a unique set of settings. Some examples are described below of conceivable driving modes according to various embodiments of the invention, which have different effects depending on the settings covered by the respective mode, which define how the vehicle is to react in different situations. The driving modes are here called Economy, Comfort, Power and Normal. Specialists will appreciate that other names may of course be used for driving modes and that the settings defined for each driving mode are adjustable, e.g. depending on the nature of the vehicle, the driver's personality, etc.

The Economy mode comprises settings which make the vehicle's running behaviour more economical. One such setting defines a maximum range width between the second lower and upper limit values $v_{min}$ and $v_{max}$ and/or maximum acceleration and/or retardation, which from a fuel economy perspective are the maximum permissible. Here the weighting parameter $\beta$ may also be given a value such that the driving mode gives priority to fuel economy. For example, a mean value for maximum permissible acceleration and/or retardation may be defined. A large range width between the second lower and upper limit values $v_{min}$ and $v_{max}$ makes it possible to save more fuel on undulating roads with substantial hills by providing more scope for utilising the vehicle's potential energy and kinetic energy on downhill runs.

A driver who chooses Economy mode thus allows larger variations in the vehicle's speed in order to save fuel. According to an embodiment, the speed range is limited between the lower and upper limit values $v_{min}$ and $v_{max}$ so that lowering of speed is only allowed in order to give more priority to fuel saving than to journey time.

In Economy mode, according to an embodiment, the acceleration and/or retardation may also be ramped up and down respectively during accelerations and retardations, which ramping depends on the driving mode chosen.

According to an embodiment, a further lower limit value $v_{min2}$ and a further upper limit value $v_{max2}$ are defined on the basis of the choice of driving mode and are related to a set speed $v_{set}$.

The Comfort driving mode comprises settings which make the vehicle economical without detracting from comfort. For example, a medium range width between the lower and upper limit values $v_{min}$ and $v_{max}$ may be defined, resulting in a narrower range than in Economy mode. Here the weighting parameter $\beta$ may also be given a value ($\beta=1$) which gives fuel and time substantially equal importance. A mean value may also be defined for permissible acceleration and/or retardation, i.e. a value for a in Torricelli's equation (eq. 1), which is lower than the value used in Economy mode. These settings result in greater comfort than in Economy mode.

The Power driving mode comprises settings which make the vehicle's running behaviour more powerful. For example, a minimum range width may be defined between the second lower and upper limit values $v_{min}$ and $v_{max}$, resulting in a wider range than in, for example, Economy mode. Here the weighting parameter $\beta$ may also be given a value which prioritises time over fuel. Maximum permissible acceleration and/or retardation may also be defined. A driver who chooses Power mode is assumed to wish to feel the "power" in the vehicle, so less priority is attached to fuel saving than in the other modes. The settings for acceleration and/or retardation depend here on engine performance and/or vehicle weight. In this mode the automatic gear choice system is preferably also set to change gear in hilly terrain, which means the vehicle running at a generally higher engine speed.

The Normal driving mode comprises settings which make the vehicle both economical and comfortable. Here the range width between the second lower and upper limit values $v_{min}$ and $v_{max}$ is defined as evenly split relative to the set speed $v_{set}$. In this mode the driver is assumed to desire a combination of both comfort and fuel saving, so the range width between the second lower and upper limit values $v_{min}$ and $v_{max}$ is set symmetrically relative to the set speed $v_{set}$, e.g. −5 and +5 km about 80 km/h.

According to an embodiment, a set of settings is used which causes the vehicle to achieve shorter journey time without increasing fuel consumption. These settings may for example be incorporated in Power mode or be catered for by a further mode of their own. The weighting parameter $\beta$ and the speed range between the second lower and upper limit values $v_{min}$ and $v_{max}$ are then such that priority is given to speed increases before uphill runs, which is advantageous for journey time. The settings are such that the speed is lowered slightly before steep downhill runs, to avoid having to brake downhill.

The settings may be such that the fuel supply is throttled, e.g. when speed lowering is to be effected. Throttling the fuel supply may for example be achieved by lowering the reference speed $v_{ref}$ in such a large step that the engine produces drag torque. The trigger point for fuel injection throttling to begin is here chosen such that desired lowering to a segment entry speed $v_i$ is achieved, where possible. The module's calculation unit here calculates when the fuel injection to the engine is to be throttled, and sends appropriate reference values to the control system when it is time to throttle the fuel supply.

This driving mode may thus define the way in which lowering of speed is to be effected to avoid unnecessary braking. Throttling the fuel supply increases the vehicle's spot speed as compared with ramping its speed down, e.g. by applying Torricelli's equation (eq. 1). Speed increases (acceleration of the vehicle) may be ramped before steep climbs so that the vehicle does not lose as much spot speed uphill as it would by not increasing speed before the climb. Driving the vehicle in this way makes it possible to reduce journey time without increasing fuel consumption. The shorter journey time may also be converted to less fuel consumption by lowering the vehicle's average speed.

According to an embodiment of the invention, the mode choice defines a weighting parameter $\beta$ which is used in evaluating one or more cost functions when determining said at least one reference value.

The cost for at least one of the second predicted vehicle speed $v_{pred\_Tnew}$ and a third predicted vehicle speed $v_{pred\_Tk+new}$ may here be calculated by using at least one cost function $J_{Tnew}$, $J_{Tk+new}$.

According to an embodiment, the respective cost functions $J_{Tnew}$ and $J_{Tk+new}$ are determined for the second predicted vehicle speed $v_{pred\_Tnew}$ and for a third predicted vehicle speed $v_{pred\_Tk+new}$ by weighting their respective energy reductions and journey time reductions relative to the first predicted speed $v_{pred\_cc}$ by said weighting parameter $\beta$.

Reference values on which the vehicle is to be regulated may then be determined on the basis of a fourth comparison of the cost functions $J_{Tnew}$ and $J_{Tk+new}$ for the second predicted vehicle speed $v_{pred\_Tnew}$ and for the third predicted vehicle speed $v_{pred\_Tk+new}$.

The present invention is not restricted to the embodiments described above. Various alternatives, modifications and equivalents may be used. The aforesaid embodiments therefore do not limit the invention's scope which is defined by the attached claims.

The invention claimed is:

1. A control system configured to determine at least one reference value for controlling a speed of a vehicle, the control system comprising:
a set speed input unit configured to receive at least one set speed $v_{set}$ for the vehicle;
a mode choice receiving unit configured to receive a choice from at least two selectable driving modes, each driving mode comprising a setting which influences the determination of the at least one reference value;
a map data and location data-based horizon unit configured to determine an itinerary by reference to map data and location data, the horizon made up of at least one route segment with at least one characteristic;
a simulation cycle calculation unit configured to perform a number of simulation cycles $s_j$, each simulation cycle comprising a number N of simulation steps conducted at a predetermined rate f, the simulation steps including:
making a first prediction of the speed $V_{pred\_cc}$ of the vehicle along the horizon such that the set speed $v_{set}$ is taken as a reference speed $v_{ref}$, the first prediction made based on the characteristic of said route segment;
comparing, as a first comparison, the first predicted vehicle speed $v_{pred\_cc}$ with first lower and upper limit values $v_{lim1}$ and $v_{lim2}$ to define an engine torque T, the engine torque T used in an immediately following simulation cycle $s_{j+1}$;
making a second prediction of the speed $V_{pred\_Tnew}$ of the vehicle along the horizon, the engine torque T being a value defined in said first comparison in an immediately preceding simulation cycle $s_{j-1}$; and
comparing, as a second comparison, the second predicted vehicle speed $v_{pred\_Tnew}$ with at least one of second lower and upper limit values $v_{min}$ and $v_{max}$, wherein $v_{min}$ and $v_{max}$ delineate a range within which the speed of the vehicle is maintained; and
determining said at least one reference value along the horizon based on the chosen driving mode and on said second comparison and/or the second predicted vehicle speed $V_{pred\_Tnew}$ in this simulation cycle $s_j$, so that the at least one reference value is within the range bounded by the second lower and upper limit values $v_{min}$ and $v_{max}$; and
the control system configured to regulate the speed of the vehicle according to said at least one reference value.

2. The control system according to claim 1, wherein the second lower and upper limit values $v_{min}$ and $v_{max}$ are defined on the basis of the choice of driving mode.

3. The control system according to claim 1, wherein a further lower limit value $v_{min}$ and upper limit value $v_{max2}$ are defined based on the choice of driving mode and are related to the at least one set speed $v_{set}$.

4. The control system according to claim 1, wherein the choice of driving mode decides how said at least one reference value is determined.

5. The control system according to claim 1, wherein said at least one reference value is a reference speed $v_{ref}$, and the mode choice defines a permissible acceleration and/or retardation of the vehicle.

6. The control system according to claim 1, wherein the mode choice defines a weighting parameter β, which is used in evaluation of one or more cost functions when determining said at least one reference value.

7. The control system according to claim 6, wherein the calculation unit is configured to perform the simulations by calculating the cost for the second predicted vehicle speed $v_{pred\_Tnew}$ and/or a third predicted vehicle speed $V_{pred\_Tk+new}$ by use of at least one cost function $J_{Tnew}$, $J_{Tk+new}$.

8. The control system according to claim 7, wherein the calculation unit is configured to determine the cost functions $J_{Tnew}$ and $J_{Tk+new}$ for the second predicted vehicle speed $v_{pred\_Tnew}$ and a third predicted vehicle speed $v_{pred\_Tk+new}$ by weighting with the weighting parameter β, respectively, their energy reductions and journey time reductions relative to the first predicted vehicle speed $V_{pred\_cc}$.

9. The control system according to claim 8, wherein the calculation unit is configured to compare, as a fourth comparison, the cost functions $J_{Tnew}$ and $J_{Tk+new}$ for the second predicted vehicle speed $V_{pred\_Tnew}$ and for a third predicted vehicle speed $v_{pred\_Tk+new}$;
wherein the determination of the at least one is based on said fourth comparison.

10. A method for determination of at least one reference value for a control system of a vehicle, wherein the method comprises:
acquiring a set speed $v_{set}$ for the vehicle;
receiving a choice from at least two selectable driving modes, each driving mode comprising a setting which influences the determination of the at least one reference value;
determining for the itinerary, by reference to map data and location data, a horizon made up of at least one route segment with at least one characteristic;
performing, by a module incorporating an automated processor, a number of simulation cycles, each simulation cycle $s_j$, comprising a number N of simulation steps conducted at a predetermined rate f, the simulation steps comprising:
making a first prediction of the speed $V_{pred\_cc}$ of the vehicle along the horizon according to a conventional cruise control when the set speed $v_{set}$ is imparted as a reference speed $v_{ref}$, the first prediction depending on the at least one characteristic of the route segment;
comparing, as a first comparison, the first predicted vehicle speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;
making a second prediction of the vehicle's speed $V_{pred\_Tnew}$ along the horizon when the vehicle's engine torque T is a value which depends on the result of said first comparison in an immediately preceding simulation cycle $s_{j-1}$;
comparing, as a second comparison, the second predicted vehicle speed $V_{pred\_Tnew}$ with at least one of second lower and upper limit values $v_{min}$ and $v_{max}$, wherein the second lower and upper limit values $v_{min}$ and $v_{max}$ delineate a range within which the speed of the vehicle is maintained;
determining the at least one reference value based on said mode choice and on said second comparison and/or the second predicted vehicle speed $V_{pred\_Tnew}$ in this simulation cycle $s_j$, such that the at least one reference value is within a range bounded by the second lower and upper limit values $v_{min}$ and $v_{max}$; and regulating, by a control system of the vehicle, based on said at least one reference value, the speed of the vehicle.

11. A method according to claim 10, wherein the second lower and upper limit values $v_{min}$ and $v_{max}$ are defined based on the choice of driving mode.

12. A method according to claim 10, wherein a further lower limit value $v_{min2}$ and upper limit value $v_{max2}$ are defined based on the choice of driving mode and based on the set speed $v_{set}$.

13. A method according to claim 10, wherein the choice of driving mode decides how said at least one reference value is determined.

14. A method according to claim 10, wherein, when said at least one reference value is a reference speed $v_{ref}$, the mode choice defines a permissible acceleration and/or retardation of the vehicle.

15. A method according to claim 10, wherein the mode choice defines a weighting parameter β, the weighting parameter β used in evaluation of one or more cost functions when determining said at least one reference value.

16. A method according to claim 15, wherein the simulations are performed by calculating the cost for the second predicted vehicle speed $V_{pred\_Tnew}$ and/or a third predicted vehicle speed $V_{pred\_Tk+new}$ by use of at least one cost function $J_{Tnew}$, $J_{Tk+new}$.

17. A method according to claim 16, wherein the respective cost functions $J_{Tnew}$ and $J_{Tk+new}$ are determined for the second predicted vehicle speed $v_{pred\_Tnew}$ and a third predicted vehicle speed $V_{pred\_Tk+new}$ by weighting with the weighting parameter β, respectively, energy reductions and journey time reductions relative to the first predicted vehicle speed $V_{pred\_cc}$.

18. A method according to claim 17, further comprising, comparing, as a fourth comparison, the cost functions $J_{Tnew}$ and $J_{Tk+new}$ for the second predicted vehicle speed $V_{pred\_Tnew}$ and for a third predicted vehicle speed $V_{pred\_Tk+new}$, wherein the at least one reference value is determined based on said fourth comparison.

19. A non-transitory computer-readable medium product comprising instructions configured to enable a computer of a vehicle to perform, when the instructions are run on said computer, a method comprising:

acquiring a set speed $v_{set}$ for the vehicle;

receiving a choice from at least two selectable driving modes, each driving mode comprising a setting which influences the determination of the at least one reference value;

determining for the itinerary, by reference to map data and location data, a horizon made up of at least one route segment with at least one characteristic;

performing, by a module incorporating an automated processor, a number of simulation cycles, each simulation cycle $s_j$, comprising a number N of simulation steps conducted at a predetermined rate f, the simulation steps comprising:

making a first prediction of the speed $v_{pred\_cc}$ of the vehicle along the horizon according to a conventional cruise control when the set speed $v_{set}$ is imparted as a reference speed $v_{ref}$, the first prediction depending on the at least one characteristic of the route segment;

comparing, as a first comparison, the first predicted vehicle speed $v_{pred\_cc}$ with at least one of first lower and upper limit values $v_{lim1}$ and $v_{lim2}$, wherein the first lower and upper limit values $v_{lim1}$ and $v_{lim2}$ define an engine torque T for use in an immediately following simulation cycle $s_{j+1}$;

making a second prediction of the vehicle's speed $V_{pred\_Tnew}$ along the horizon when the vehicle's engine torque T is a value which depends on the result of said first comparison in an immediately preceding simulation cycle $s_{j-1}$;

comparing, as a second comparison, the second predicted vehicle speed $V_{pred\_Tnew}$ with at least one of second lower and upper limit values $v_{min}$ and $v_{max}$, wherein the second lower and upper limit values $v_{min}$ and $v_{max}$ delineate a range within which the speed of the vehicle is maintained; and determining the at least one reference value based on said mode choice and on said second comparison and/or the second predicted vehicle speed $v_{pred\_Tnew}$ in this simulation cycle $s_j$, such that the at least one reference value is within a range bounded by the second lower and upper limit values $v_{min}$ and $v_{max}$, wherein a control system of the vehicle regulates a speed of the vehicle based on said at least one reference value.

20. A vehicle comprising a control system configured to determine at least one reference value for controlling a speed of the vehicle, the control system comprising:

a set speed input unit configured to receive at least one set speed $v_{set}$ for the vehicle;

a mode choice receiving unit configured to receive a choice from at least two selectable driving modes, each driving mode comprising a setting which influences the determination of the at least one reference value;

a map data and location data-based horizon unit configured to determine an itinerary by reference to map data and location data, the horizon made up of at least one route segment with at least one characteristic;

a simulation cycle calculation unit configured to perform a number of simulation cycles $s_j$, each simulation cycle comprising a number N of simulation steps conducted at a predetermined rate f, the simulation steps including:

making a first prediction of the speed $V_{pred\_cc}$ of the vehicle along the horizon such that the set speed $v_{set}$ is taken as a reference speed $v_{ref}$, the first prediction made based on the characteristic of said route segment;

comparing, as a first comparison, the first predicted vehicle speed $v_{pred\_cc}$ with w first lower and upper limit values $v_{lim1}$ and $v_{lim2}$ to define an engine torque T, the engine torque T used in an immediately following simulation cycle $s_{j+1}$;

making a second prediction of the speed $v_{pred\_Tnew}$ of the vehicle along the horizon, the engine torque T being a value defined in said first comparison in an immediately preceding simulation cycle $s_{j-1}$;

comparing, as a second comparison, the second predicted vehicle speed $v_{pred\_Tnew}$ with at least one of second lower and upper limit values $v_{min}$ and $v_{max}$, wherein $v_{min}$ and $v_{max}$ delineate a range within which the speed of the vehicle is maintained;

determining said at least one reference value along the horizon based on the chosen driving mode and on said second comparison and/or the second predicted vehicle speed $v_{pred\_Tnew}$ in this simulation cycle $s_j$, so that the at least one reference value is within the range bounded by the second lower and upper limit values $v_{min}$ and $v_{max}$; and the control system configured to regulate the speed of the vehicle according to said at least one reference value.

* * * * *